United States Patent

Ozaki et al.

[11] Patent Number: 5,553,831
[45] Date of Patent: Sep. 10, 1996

[54] BALL VALVE

[75] Inventors: Yoshito Ozaki; Katsuhiro Onishi, both of Nobeoka, Japan

[73] Assignee: Asahi Yukizai Kogyo Co., Ltd., Miyazaki, Japan

[21] Appl. No.: 356,307

[22] PCT Filed: Mar. 24, 1994

[86] PCT No.: PCT/JP94/00475

§ 371 Date: Dec. 20, 1994

§ 102(e) Date: Dec. 20, 1994

[87] PCT Pub. No.: WO94/24470

PCT Pub. Date: Oct. 27, 1994

[30] Foreign Application Priority Data

Apr. 21, 1993 [JP] Japan ................. 5-020705 U

[51] Int. Cl.⁶ ............................................... F16K 5/06
[52] U.S. Cl. ................ 251/292; 251/143; 251/315.01
[58] Field of Search ................................ 251/292, 143, 251/315.01; 137/343

[56] References Cited

U.S. PATENT DOCUMENTS

| | | | |
|---|---|---|---|
| 1,562,195 | 11/1925 | Schenck | 251/143 |
| 3,302,912 | 2/1967 | Hurlburt, Jr. | 251/143 X |
| 4,284,100 | 8/1981 | Scapes et al. | 137/343 |
| 4,432,392 | 2/1984 | Paley | 137/343 |
| 4,708,158 | 11/1987 | Akamatsu | 251/143 X |
| 4,887,634 | 12/1989 | Killian | 251/292 X |
| 5,240,030 | 8/1993 | Wang | 251/292 X |

FOREIGN PATENT DOCUMENTS 59132955  9/1984  Japan.

*Primary Examiner*—John C. Fox
*Attorney, Agent, or Firm*—Burns, Doane, Swecker & Mathis, L.L.P.

[57] ABSTRACT

A ball valve which is opened and shut by the rotation of a spindle (5) to rotate a valve ball (2) engaged with the spindle (5), characterized in that a neck portion (4) of a valve body bearing the spindle (5) is provided integrally therewith with a top flange (7) for mounting either of a handle or an actuator for the operation of the spindle.

12 Claims, 4 Drawing Sheets

BALL VALVE

TECHNICAL FIELD

The present invention relates to a ball valve, more particularly to a ball valve of a structure capable of being easily changed to a manual type or an automatic type while using the same valve body.

BACKGROUND ART

Hitherto, ball valves have been generally prepared for a manual type or an automatic type respectively, and separately used in accordance with the purpose thereof.

In the case of a manual type, a ball valve is opened and shut by manually rotating a handle mounted on a spindle borne in a neck portion of a valve body so as to rotate a valve ball, while in the case of an automatic type, the ball valve is opened and shut in the same manner as above by rotating the spindle by an actuator mounted on the upper portion of the valve body.

However, separately preparing the valves of both types results in a higher manufacturing cost, and there is a further problem when a manual type ball valve mounted on a pipe line is converted to an automatic type, in that the ball valve must be wholly replaced. In order to solve such problems, study has been carried out to convert the manual type ball valve to the automatic type while using the valve body of the former, and an example of the above is disclosed in Japanese Unexamined Utility Model Publication No. 62-69677.

According to the valve disclosed in the above Publication, a mounting body is secured to a manual type (ball) valve body and grips the valve body from the upper and lower sides thereof to form a mounting device, and an actuator is attached to the thus-formed mounting device to convert the valve into an automatic type.

In the valve of the above type, however, there are the following problems:

a mounting device is necessary when the actuator is attached;

the actuator may deviate from center because it is not directly secured to the valve body;

the operation of the actuator may become unstable due to loosening of the mounting device;

a separately-prepared saddle is necessary for fixing a pipe directly connected to the valve body; and a mount is necessary for a panel piping.

Also, another example of a ball valve capable of being changed from a manual type to an automatic type is disclosed in Japanese Unexamined Utility Model Publication No. 62-66072.

In the ball valve disclosed in the above publication, an actuator is secured to a ground portion via a frame, the ground portion separated from a valve body is mounted on the valve body so that the ground portion can be used as a mounting bed for the handle or the actuator. Thus, there are problems in that additional parts such as the ground portion and the frame are necessary, and the structure of the ball valve becomes relatively complicated.

DISCLOSURE OF THE INVENTION

The present invention has been provided in view of the above problems of the prior art, and an object thereof is to provide a ball valve having a structure readily changeable from a manual type to an automatic type or from an automatic type to a manual type while using the same valve body.

After various trials and errors, the present inventors have solved the above problems of the prior art by utilizing the valve body of the manual type ball valve and contriving the neck portion thereof, and reached the present invention.

That is, the present invention is a ball valve which is opened and shut by the operation of a spindle to rotate a valve ball engaged with the spindle, characterized in that a neck portion of a valve body bearing the spindle is provided integrally therewith with a top flange for mounting either of a handle or an actuator for the operation of the spindle.

According to a preferred embodiment of the present invention, the top flange for mounting either of the handle or the actuator is provided by molding the top flange integrally with the valve body. Also, the shape of the top flange is preferably quadrilateral or circular.

Further, according to a preferred embodiment of the present invention, a stand is provided on a bottom of the valve body, and the stand is provided with holes for securing the valve.

Also, threaded fasteners are embedded in the holes for securing the valve.

In this regard, there is no limitation on the internal structures of the ball valve according to the present invention, provided they are normally in practice. Also, there is no limitation to materials of the valve: that is, any of various metals, various plastics or fiber-reinforced plastics can be used.

The feature of the present invention is that the conversion from manual type to automatic type or from automatic type to manual type can be easily carried out, without the necessity of attachment/detachment of the mount and so on.

According to the present invention, when the actuator is mounted directly onto the top flange provided in the neck portion of the valve body of the ball valve, the valve functions as an automatic type; while when the handle is directly mounted thereon, it functions as a manual type.

Further, if the stand is provided on the bottom of the ball valve, it is convenient because the valve can stand in a stable manner which is particularly favorable in the case of an automatic type ball valve provided with the actuator.

In addition, if holes are provided in the stand for securing the valve, in which threaded fittings are embedded, it is possible to readily secure the valve when the piping is laid out on a panel or in the interior of the installation.

Therefore, means for fixing the pipe directly connected to the valve, such as a saddle, are unnecessary as compared with the prior art.

BEST MADE OF CARRYING OUT THE INVENTION

Embodiments of the present invention will be described in detail with reference to the drawings.

Figure 1:
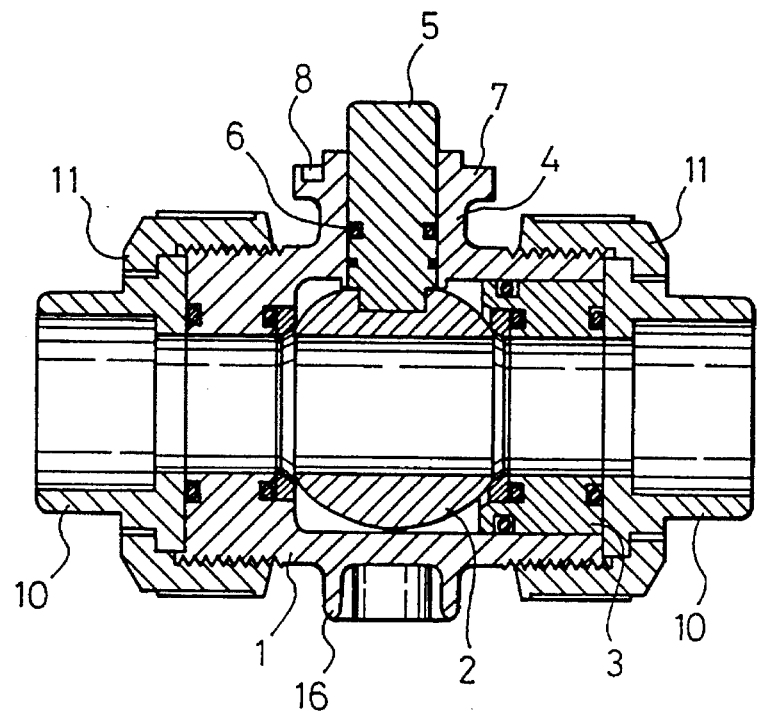
FIG. 1 is a longitudinal section of the main part of a first embodiment of the present invention.

FIG. 1 is a longitudinal section of a rotary type ball valve made of polyvinylchloride (in which a handle and an actuator are removed) illustrating one embodiment of the present invention.

In this drawing, a ball 2 is accommodated in a central area of the interior of a valve body 1 (hereinafter referred to as "body") and a union 3 for retaining the ball 2 is fitted in the body from one side thereof.

In the interior of a neck portion 4 projected upward from the body 1 at the center thereof, a spindle 5 engaged with the ball 2 is rotatably held via an O-ring 6.

A quadrangular top flange 7 is integrally provided by molding on the outer periphery of the neck portion 4.

Figure 2:
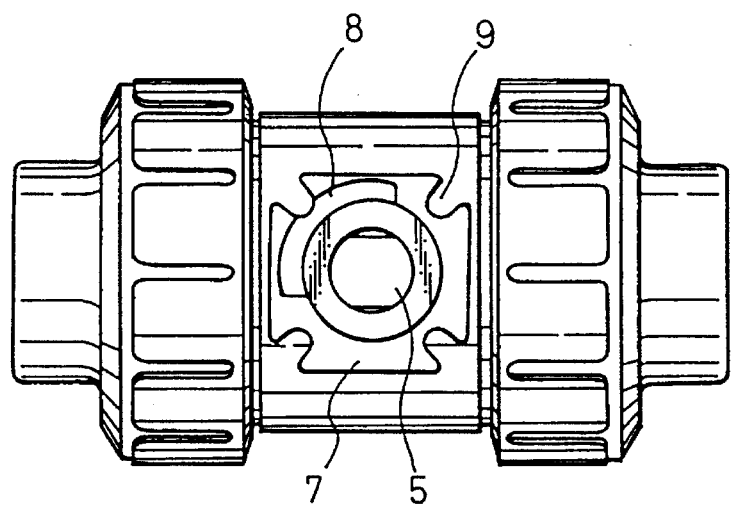
FIG. 2 is a plan view of the ball valve shown in FIG. 1.

The top flange 7 has an arcuate groove 8 engageable with a stop 13 of a handle 12 (see FIG. 3) to be mounted to the spindle 5 and for causing the handle to rotate so far as a 90° angular distance, as shown in FIG. 2. Through-grooves 9 are provided at the respective corners of the top flange 7, for inserting bolts 15 (see FIG. 4) for securing an actuator 14.

The shape of the top flange 7 is not restricted to a quadrangle but may be circular or another shape. In addition, the position and size thereof may be freely selected in accordance with the valve structure therearound. In this embodiment, as illustrated, the top flange is provided in the upper part of the neck portion 4 to be located between both cap nuts 11 described later.

In this connection, the top flange 7 may be provided not only by the integration molding but also by adhesive, thread engagement or the like.

Body caps 10 are secured to the respective sides of the body 1 by engaging the mating cap nuts 11 with the body 1.

Figure 5:
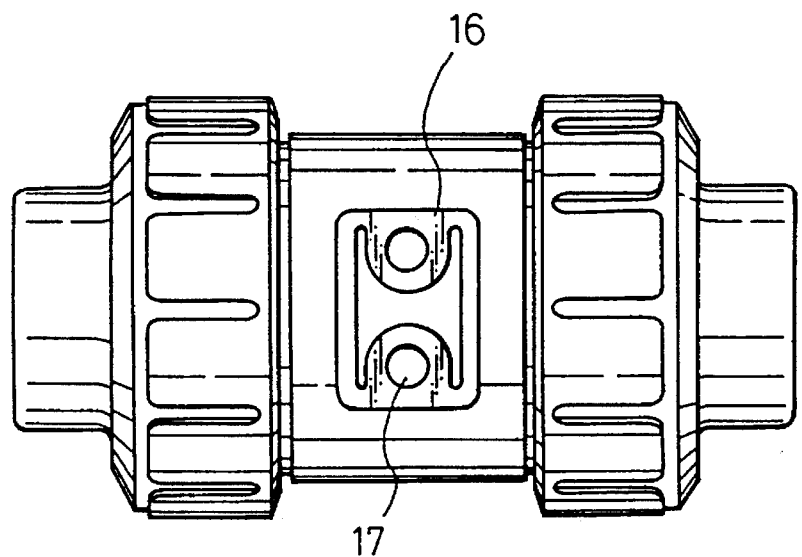
FIG. 5 is a bottom view of the ball valve shown in FIG. 1.

A quadrangular stand 16 is provided on a bottom of the body 1. The height, size, shape or the like are not specially limited but may be optionally selected. As shown in FIG. 5, the stand 16 has two holes 17 used for securing the ball valve. Usually, a fastener is inserted in each of the holes 17.

Figure 6:
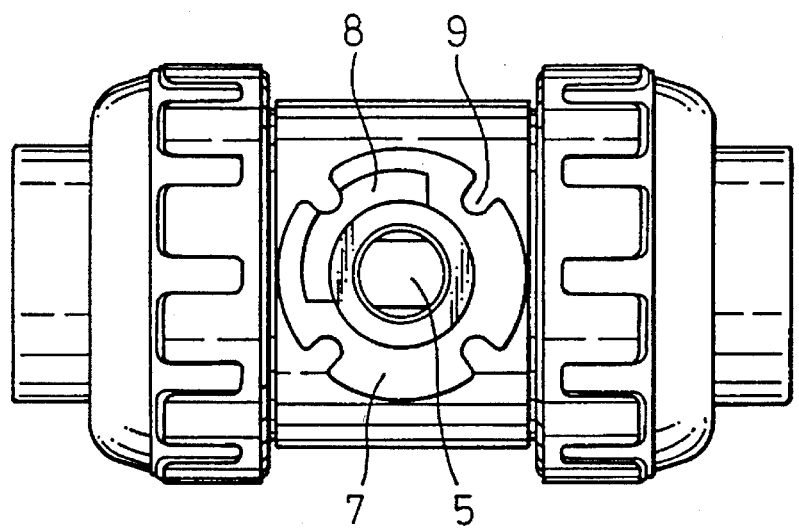
FIG. 6 is a plan view of the main part showing another embodiment of the present invention.
Figure 7:
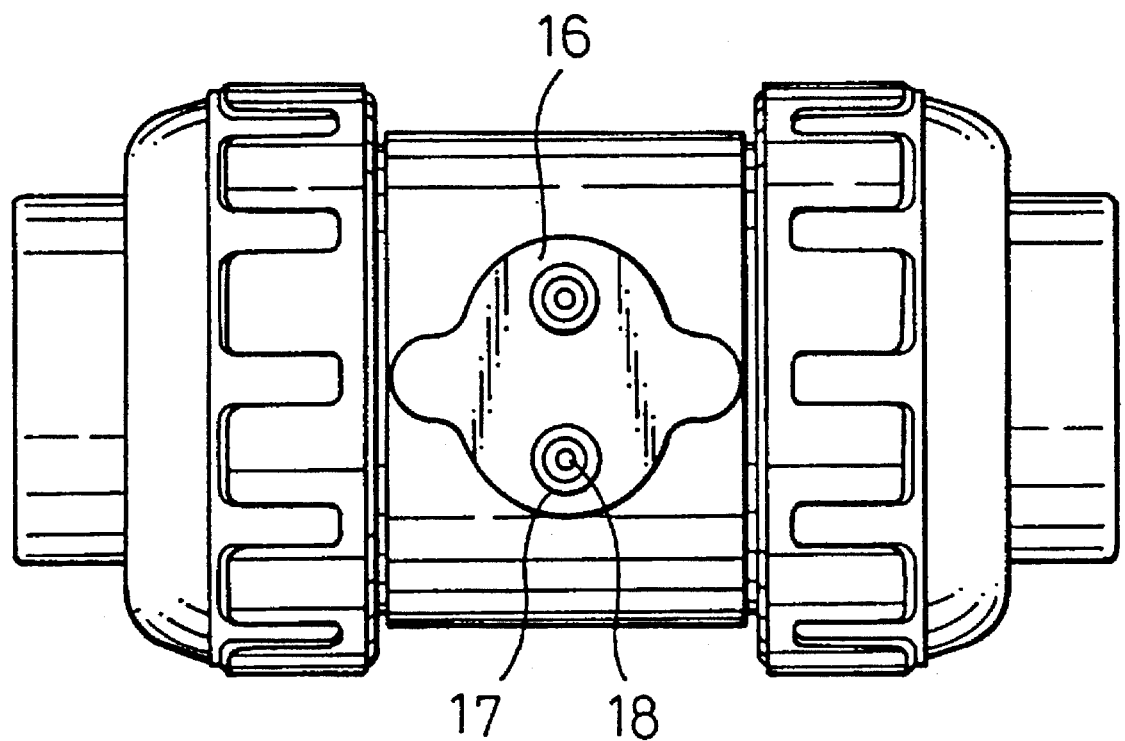
FIG. 7 is a bottom view of the ball valve shown in FIG. 6.

FIGS. 6 and 7 are respectively a plan view and a bottom view of a main part, illustrating another embodiment of the present invention.

As seen in the drawings, in the case of this embodiment, the top flange is formed in a circular shape, and the stand 16 is also formed in a circular shape. In addition, threaded fasteners 18 are embedded in the securing holes 17 provided in the stand 16 so that the stand 16 can be secured by bolts.

Next, the operation of the ball valve according to the present invention will be described below.

Figure 3:
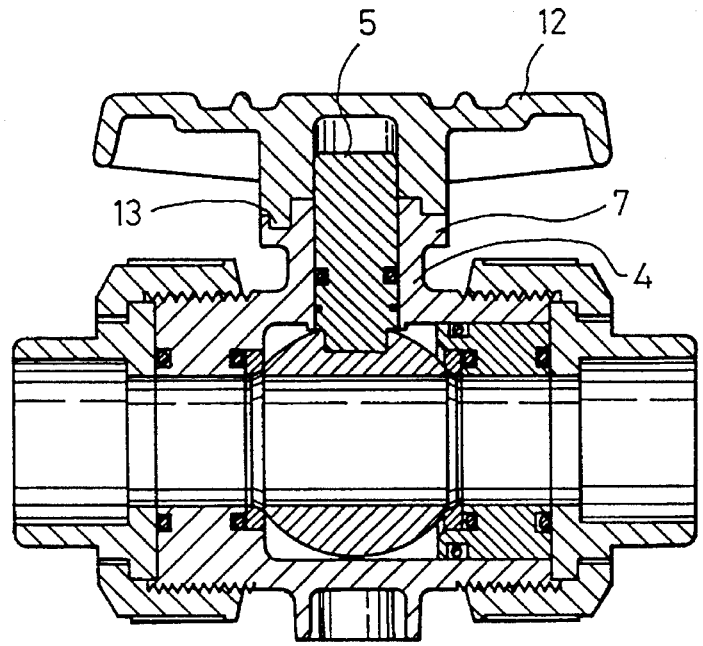
FIG. 3 is a longitudinal section of a manual type ball valve with a handle mounted while mainting the state shown in FIG. 1.

When first the handle 12 is fitted on the spindle 5 in the state shown in FIG. 1 and then the stop 13 of the handle 12 is engaged with the arcuate groove 8 of the top flange 7, the state shown in FIG. 3 is realized. If the handle 12 is manually rotated in this state, the ball 2 is correspondingly rotated to open or shut the valve. That is, the manual type ball valve is completed.

Figure 4:
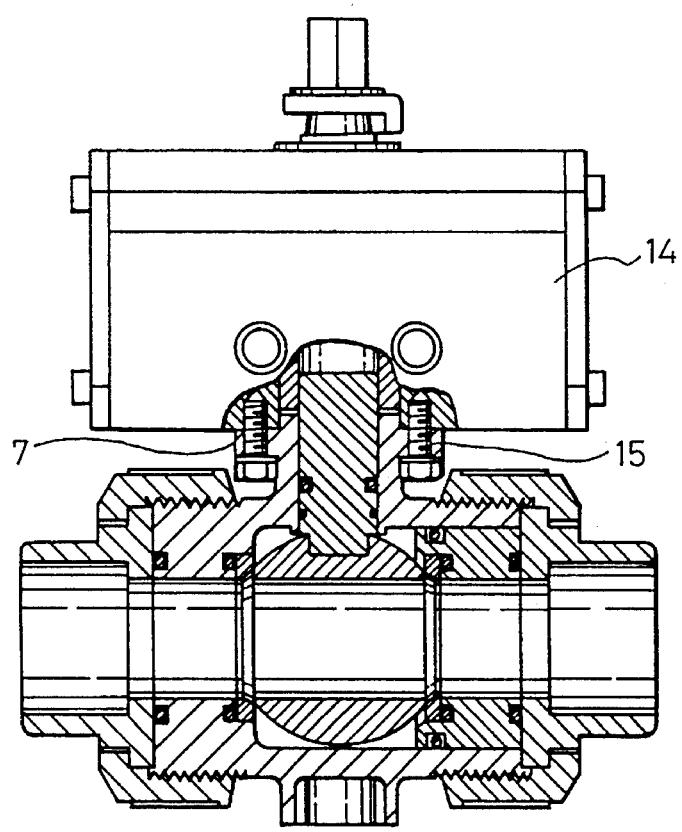
FIG. 4 is a longitudinal section partially including an elevation of an automatic type ball valve with an actuator mounted while maintaining the state shown in FIG. 1.

On the contrary, when the actuator 14 is engaged with the spindle 5 in the state shown in FIG. 1 and then secured to the flange 7 by means of the bolts 15 or the like through the through-grooves 9, the state shown in FIG. 4 is realized. If the actuator 13 is operated in this state, the ball 2 is correspondingly rotated to open or shut the valve. That is, the automatic type ball valve is completed.

Since the stand 16 is provided on the bottom of the valve body 1, it is possible to stand the body 1 in a stable manner, which is particularly favorable for the automatic type provided with the actuator 14.

Further, if a threaded fastener is embedded in each of the securing holes 17 of the stand, it is possible to easily secure the valve when the piping is laid on a panel or in the interior of an installation.

Accordingly, a saddle used in the prior art for securing a pipe directly connected to the valve is unnecessary.

The ball valve according to the present invention has the following advantages:

(1) Since the handle or actuator is easily mountable, it is possible to readily change the ball valve from the manual type to the automatic type or from the automatic type to the manual type.

(2) Since few parts are necessary, the valve can be compact.

(3) Since the actuator is directly secured to the ball valve body, the structure becomes stable whereby off-centering hardly occurs.

(4) If the stand is provided on the bottom of the ball valve body, it is possible to stand the valve in a stable state.

(5) If the securing holes are provided in the stand, it is possible to easily secure the valve when the piping is laid on the panel or in the interior of the installation. Accordingly, a saddle or the like is unnecessary to secure the pipe directly connected to the ball valve.

FIELD OF UTILIZATION IN INDUSTRY

The present invention is preferably applicable for a fluid transportation pipe line for water, oil, gas, chemicals, food stuffs or the like in various industries.

What is claimed is:

1. A ball valve which is opened and shut through rotation of a spindle to rotate a valve ball engaged with the spindle, wherein a neck portion of a valve body bearing the spindle is integrally provided with a top flange for mounting either of a handle or an actuator for the operation of the spindle, wherein the valve body includes a stand integrally formed in one piece with the valve body, said stand being positioned on a side of the valve body opposite the neck portion, said stand including means for securing the ball valve.

2. A ball valve according to claim 1, wherein the top flange is formed by integral-molding.

3. A ball valve according to claim 1, wherein the top flange is attached by adhering.

4. A ball valve according to claim 1, wherein the top flange is attached by screwing.

5. A ball valve according to claim 1, wherein the shape of the top flange is a quadrangle.

6. A ball valve according to claim 1, wherein the shape of the top flange is a circle.

7. A ball valve according to claim 1, wherein the means for securing the ball valve includes a plurality of holes for securing the ball valve.

8. A ball valve according to claim 7, including threaded fasteners embedded in the holes for securing the ball valve.

9. A ball valve comprising:

a valve body having an outwardly projecting neck portion that is integrally formed in one piece with the valve body, wherein the valve body includes a stand integrally formed in one piece with the valve body, said stand being positioned on a side of the valve body opposite the neck portion;

a valve ball positioned within the valve body for movement between opened and closed positions, said stand including means for securing the ball valve;

a spindle in operative engagement with the valve ball, said spindle extending through the neck portion so that the neck portion encircles an outer periphery of the spindle;

a flange extending from the neck portion;

mounting means provided on the flange for permitting alternative mounting of a manually operable handle and an actuator for effecting operation of the spindle and movement of the valve ball between the opened and closed positions.

10. A ball valve according to claim 9, wherein said mounting means includes a groove formed in the flange for receiving a stop of a manually operable handle to mount the handle on the flange, and through holes formed in the flange for receiving bolts to mount the actuator on the flange.

11. A ball valve according to claim 9, wherein the valve body includes a stand integrally formed in one piece with the valve body, said stand being positioned on a side of the valve body opposite the neck portion, said stand including means for securing the ball valve.

12. A ball valve according to claim 9, wherein a portion of the spindle extends above the neck portion.

* * * * *